Figure 1:
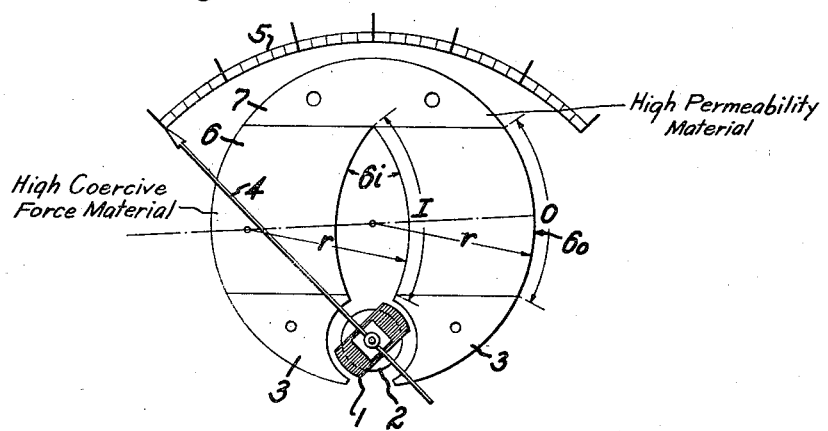

Sept. 4, 1945.   F. X. LAMB   2,384,316
ELECTRICAL INSTRUMENT
Filed Oct. 23, 1941

Inventor:
Francis X. Lamb,
By Pierce & Scheffler,
Attorneys.

Patented Sept. 4, 1945

2,384,316

UNITED STATES PATENT OFFICE 2,384,316

ELECTRICAL INSTRUMENT

Francis X. Lamb, East Orange, N. J., assignor to Weston Electrical Instrument Corporation, Newark, N. J., a corporation of New Jersey Application October 23, 1941, Serial No. 416,277

3 Claims. (Cl. 171—95)

This invention relates to electrical measuring, indicating or relay instruments and particularly to the permanent magnet field structure for sensitive direct current electrical instruments.

Such instruments include a coil that is pivotally mounted for angular movement, in accordance with the current flow through the coil, in the gap between the opposed poles of a permanent magnet field system. The sensitivity of the instrument depends upon the flux density of the field in which the coil moves, and the flux density at the gap is limited by the leakage flux which increases as the length of the permanent magnet is decreased. The improvements in permanent magnet materials during recent years have made it possible to decrease the length of the permanent magnet field structure and the overall dimensions of the electrical instrument but the relatively expensive permanent magnet material was not used to best efficiency; when "efficiency" is defined as the ratio of the flux density to the quantity of permanent magnet material.

The present practice in the construction of direct current instruments of small size and high sensitivity is to employ a circular magnet, and to form the magnet of a material of high coercive force that provides a relatively high flux density for a small permanent magnet. Soft iron pole pieces are usually secured to the ends of the circular magnet to facilitate the shaping of the opposed polar surfaces to a desired contour and to obtain a more uniform flux distribution than is possible when the polar surfaces are formed directly on the opposed ends of the relatively hard permanent magnet material.

An object of the present invention is to provide an electrical instrument of the direct current type in which the permanent magnet structure is of substantially higher efficiency, in terms of the effective flux density with respect to the amount of permanent magnet material, than can be obtained with prior instrument designs. An object is to provide a permanent magnet structure, for use in a direct current electrical instrument having a cylindrical case, which develops a substantially greater magnetomotive strength than has been possible with magnet structures of prior design that could be employed on the same instrument case. More specifically, an object is to provide a permanent magnet structure, for an electrical instrument, which is of constant cross-section throughout the permanent magnet section or sections, and in which the permanent magnet section is of substantially constant length as measured along the lines of magnet flux flow.

Figure 2:
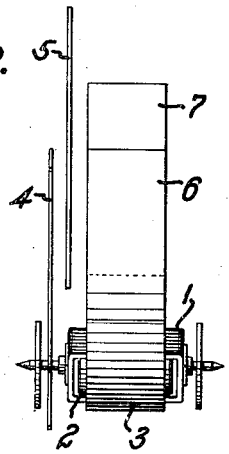

These and other objects of the invention will be apparent from the following specification when taken with the accompanying drawing in which:

Fig. 1 is a somewhat diagrammatic plan view, with non-essential elements omitted, of an electrical instrument embodying the invention; and Fig. 2 is a side elevation of the same.

In the drawing, the reference numeral 1 identifies the instrument coil that is pivotally supported for angular movement about the core 2 that is positioned between the opposed polar surfaces of the soft iron or soft steel pole pieces 3. The coil 1 carries a pointer 4 that moves along the graduated scale 5 of the instrument.

In accordance with the invention, the magnetic structure which terminates in the pole pieces 3 is not a single "circular" magnet but a pair of symmetrically arranged arcuate magnet members 6 that contact at their upper inner edges and are spanned by a soft iron or steel segment 7. The parts 3, 6 and 7 are secured to each other by bolts or by welding or brazing operations. The outer surface of the magnetic assembly may, and preferably does, conform to that of a right circular cylinder, and the inner surfaces 6i of the permanent magnets are also right cylindrical surfaces but with the same radius of curvature $r$ as the outer surfaces 6o of the magnets. The inner length I of each permanent magnet section is therefore equal to the outer length O, and the cross-sectional area of each magnet section is therefore constant throughout its length. The cross-section of the flux path at the transverse plane of symmetry of the segment 7 is substantially smaller than that of the flux path through the permanent magnets, but this relationship does not increase the reluctance of the magnetic circuit as the segment 7 has a high permeability and can carry the entire magnetic flux.

The significance of the described geometry of the permanent magnet elements is that the flux leakage is substantially less than for a magnetic system of prior design and of the same outside diameter. The inner length of permanent magnets of known circular design is much shorter than its outer length, and the magnetomotive force is determined by the shortest magnet length. The length by which the outer surface of a conventional circular magnet exceeds the length of the inner surface is, for practical purposes, wasted magnet material. The magnetic material is all effective at the same high efficiency in the present design, and the previous wastage or low efficiency use of expensive material is avoided. It is to be noted that the flux density at the air gap would not be increased by forming the yoke 7 of permanent magnet material. On the contrary, the flux density would be reduced due to the increased reluctance of the magnetic circuit at the relatively small cross-sectional area of the segment 7. Similarly, it is not practical to increase the magnetomotive force by a reduction in the reluctance of the magnetized segment or segments 6. The transverse section can be increased only by reducing the inner length of the magnet when, as is usually the case, the outer diameter is definitely limited by the dimensions of the instrument case. This decrease in the inner length of the magnet results in a reduced total magnetomotive force which offsets any gain that might have been obtained by increasing the cross-section of the segments 7.

The described construction provides the optimum use of the permanent magnet material and a maximum flux density for an instrument magnetic system that is designed to fit within a case of a given size. The invention is not limited to constructions of the maximum possible efficiency and it is to be understood that changes may be made in the shapes and relationship of the parts without departing from the spirit of my invention as set forth in the following claims.

I claim:

1. A magnetic field structure for an electrical measuring instrument of the type having a coil pivotally supported for angular movement about a core located between and spaced from the polar faces of the magnetic field structure; said magnetic field structure comprising a pair of permanent magnet members with inner and outer arcuate surfaces of the same circumferential length and symmetrically arranged with respect to said core and each having a pair of substantially plane pole faces, the two sets of correspondingly located pole faces of the permanent magnet members being arranged in substantially parallel planes, a segmental yoke of high permeability spanning one set of pole faces of said permanent magnet members, the outer arcuate surfaces of said magnetic members and yoke conforming substantially to that of a right circular cylinder, and a pole piece of high permeability material secured to each pole face of the other set of pole faces of the permanent magnet members, said pole pieces having polar surfaces at opposite sides of and spaced from said core.

2. A magnetic field structure as recited in claim 1, wherein the maximum cross-section of the flux path through said yoke is substantially less than the cross-section of the flux path through said permanent magnet members.

3. A magnetic field structure as recited in claim 1, wherein said permanent magnet members contact each other at the edges of their pole faces spanned by said yoke.

FRANCIS X. LAMB.